United States Patent [19]
Dadic et al.

[11] 3,770,453
[45] Nov. 6, 1973

[54] STABILIZATION OF FERMENTED MALT BEVERAGES

[75] Inventors: Miroslav Dadic, Montreal; Joris E. A. Van Gheluwe, Longueuil, Montreal; Zoltan Valyi, Montreal, Quebec, all of Canada

[73] Assignee: Molson Industries Limited, Toronto A.M.F., Ontario, Canada

[22] Filed: Apr. 22, 1971

[21] Appl. No.: 136,568

[52] U.S. Cl. .................................. 426/227, 99/50.5
[51] Int. Cl. ............................................. C12h 1/04
[58] Field of Search .................... 99/48, 50.5; 62/70

[56] References Cited
UNITED STATES PATENTS

| | | | |
|---|---|---|---|
| 3,053,664 | 9/1962 | Hall et al. ................................ | 99/48 |
| 3,354,219 | 11/1967 | Rigby ............................... | 99/50.5 X |
| 3,512,987 | 5/1970 | Messing .................................. | 99/48 |
| 3,222,181 | 12/1965 | Hoelle et al. ......................... | 99/50.5 |

OTHER PUBLICATIONS

Lebreton, P., Flavores in Hops, Chemical Abstracts, Vol. 52, 1958 (pp. 15,662f & 15,663a).

Institute of Brewing Journal. Vol. 66, 1960 (pp. 198, 199 & 313–318).

Hubacek, et al., The Hop Tannins. Chemical Abstracts. Vol. 62, 1965 (p. 819g).

*Primary Examiner*—David M. Naff
*Attorney*—Thomas M. Marshall

[57] ABSTRACT

The colloidal and flavor stability of fermented malt beverages are improved by adding to the beverage quercetin or compositions produced by the absorption of components from a fermented malt beverage such as beer on nylon and recovering the components from the adsorbate.

7 Claims, No Drawings

STABILIZATION OF FERMENTED MALT BEVERAGES

The present invention relates to malt beverages and in particular the present invention relates to improving the stability including the colloidal or flavor stability of malt beverages particularly beer.

It is well known that malt beverages such as beer suffer progressive deterioration phenomena in contact with air such as developing an off taste, an excessive coloration and an increased formation of hazes. The various mechanisms of beer oxidation may involve a direct attack of molecular oxygen as well as different anaerobic enzyme-catalyzed processes. Among the major constituents of malt beverages polyphenols undergo oxidation via free radicals leading to quinones and further on to intermolecular condensation products with proteins. These reactions are responsible for the formation of non-biological hazes in such beverages. Consequently malt beverages have heretofore been treated with proteolytic enzymes (chill-proofing) as well as with various polyamides, such as perlons, nylons and polyvinylpyrrolidones and other substances such as keratin to remove a substantial part of the polyphenols. The experience with using polyamide adsorbents show that various phenolics were removed to different extents while the excessive removal thereof invariably resulted in a beverage of poor organoleptic quality. Thus it was found that removal of approximately 40 percent of the phenolics from beer increased substantially its stability while not impairing the taste of the beverage (see N.S. Curtis and A.G. Clark, J. Inst. Brew., 1960, p. 198).

It is thus believed that a certain amount of certain of the phenolic constituents of the malt beverage is indispensable for its organoleptic qualities while excessive content of some of the phenolics impairs the stability of the beverage presumably due to the oxidation phenomena heretofore referred to. The present invention provides for the addition of certain compositions to malt beverages, particularly beer, which substantially improve either the colloidal stability or the flavor stability of the malt beverage or both such stabilities without significantly detracting from its organoleptic qualities.

It has now been found that the addition of quercetin or compositions formed of different groups of polyphenols obtained from malt beverages, particularly beer, by treating the beverage with a nylon resin, particularly a Nylon 66 resin, followed by various extraction techniques of the adsorbate or its acidified or lyophilized caustic desorbate, to the malt beverage improves its colloidal and/or flavor stability without reducing significantly its organoleptic qualities.

According to the present invention therefore there is provided a method of preparing a composition suitable for improving the stability of a malt beverage which comprises passing a malt beverage through a powdered nylon resin and subjecting the nylon resin/malt beverage adsorbate so obtained to one of the following procedures: (a) refluxing with dilute hydrochloric acid and extracting with ether and (b) treating with a caustic alkali solution, filtering the desorbed powdered resin from the caustic alkali desorbate solution so obtained and either lyophilizing the caustic desorbate or acidifying the caustic desorbate and separating the precipitate from the solution and when required extracting the acidified desorbate solution with ethyl acetate or amyl alcohol and evaporating the solvent from the extract.

The present invention also provides the composition suitable for improving the stability of a malt beverage produced by the aforesaid process as well as a method of improving the stability of a malt beverage which comprises adding thereto at least about 10 parts per million of a member selected from the group consisting of quercetin or the composition used by the aforesaid process.

While the method of the present invention may be applied to any malt beverage it has particular application to beer. Further, in the aforesaid process the caustic alkali is preferably a dilute sodium hydroxide solution and the nylon resin is preferably Nylon 66 which was found to be the most adsorptive among the nylon resins in respect to the haze forming anthocyanogens.

According to one embodiment of the present invention the additive is quercetin which is added to the malt beverage e.g. the beer in an amount of at least about 10 parts per million, suitably in an amount from 10 to 150 parts per million and preferably in an amount in the range 10 to 100 parts per million. Quercetin is a natural constituent of beer and thus is very compatible with beer, is acceptable to the Food and Drug Administration and further improves both the colloidal stability and the flavor stability of the beer, i.e., it improves the shelf life of the beer. The quercetin is only slightly soluble in beer and stabilizes the beer while acting in suspension in storage before filtration.

According to another embodiment of the present invention the 66 additive is prepared by passing beer through a powdered Nylon 66 resin, refluxing the adsorbate so obtained with dilute hydrochloric acid and extracting the solution so obtained with ether. The ethereal layer upon drying and concentrating leaves a dark viscous oil which on addition to the beer in an amount of at least about 10 parts per million, suitably in an amount from 10 to 150 parts per million and preferably in an amount of 10 to 100 parts per million improves the flavor stability of the beer.

In yet another aspect of the present invention the additive is prepared by passing beer through a powdered Nylon 66 resin, heating the adsorbate so obtained with dilute aqueous sodium hydroxide solution, solidifying the product so obtained with concentrated hydrochloric acid to a pH below 2 and filtering the suspension so obtained. The dark reddish solid when added to beer improves both the colloidal stability and the flavor stability of the beer and is suitably added in an amount of at least about 10 parts per million, suitably in an amount from 10 to 150 parts per million and preferably in an amount from 10 to 100 parts per million.

In yet another aspect of the present invention the acidified mother liquor from the previous method is extracted with amyl alcohol and the alcoholic layer so obtained dried and concentrated to leave a dark oil which may be added to beer suitably in at least about 10 parts per million, suitably in an amount from 10 to 150 parts per million and preferably in amount of 10 to 100 parts per million to improve the flavor stability of the beer.

In yet a further embodiment of the present invention the acidified mother liquor is extracted with ethyl acetate and the ethyl acetate dried and evaporated to produce a dark red viscous oil which may also be added to the beer to improve the flavor stability thereof suitably in an amount of at least about 10 parts per million, suitably in an amount from 10 to 150 parts per million and preferably in an amount from 10 to 100 parts per million based on the beer.

In yet a further embodiment of the present invention the caustic desorbate from the Nylon 66 is lyophilized to produce a brownish solid which upon grinding yields a greyish powder and upon addition of the product to beer the flavor stability of the beer is improved the solid being added in an amount of at least about 10 parts per million, suitably in an amount from 10 to 150 parts per million and preferably in an amount in the range 10 to 100 parts per million.

The present invention will be further illustrated by way of the following Examples which show firstly the preparation of the compositions and subsequently their use in stabilizing beer.

EXAMPLE NO. 1

THE EXTRACT OF THE NYLON-66 BEER ADSORBATE (MD–63)

Forty liters of the beer were passed through the Nylon-66 powdered resin (10 g.) and the pass was washed free of beer with a small amount of water. It was then refluxed with 100 ml. of dilute hydrochloric acid (1:1), cooled to room temperature and extracted with two 50 ml. portions of ether. The ethereal layer was dried over anhydrous magnesium sulfate, filtered and concentrated under reduced pressure to leave MD–63 as a dark viscous oil (3.8 g.).

EXAMPLE NO. 2

CAUSTIC DESORBATE OF THE NYLON-66 BEER ADSORBATE

Nylon-66 powdered resin (300 g.) was well mixed with Celite filter aid (300 g.) and stirred with heating in 10 l. of aqueous solution containing 4 percent sodium hydroxide and 1 percent sodium dithionite ("hydrosulfite") for thirty mintues. It was then filtered and washed with 10 l. of distilled water, re-suspended in an additional 10 l. of distilled water and filtered again (th filtration was not carried out to dryness to avoid cracking of the filter aid). Degassed beer (200 l. ) was then passed through the nylon resin mixed with the filter aid. The solid residue on the filter was then extracted with 10 l. of the aqueous solution containing 4 percent sodium hydroxide and 1 percent sodium dithionite with stirring and heating up to 90° C. The extract (red-violet in color) was cooled to room temperature and stored in a refrigerator. It was used for the subsequent extraction experiments.

EXAMPLE NO. 3

ACID INSOLUBLE PRECIPITATE FROM THE CAUSTIC DESORBATE OF THE NYLON-66 BEER ADSORBATE. ("TESTINIC ACID" MD-31)

One liter of the caustic desorbate of the Nylon-66 beer adsorbate (from EXAMPLE NO. 2) was acidified with concentrated hydrochloric acid to pH below 2 and the acidic suspension kept in a refrigerator for 30 minutes. The dark-reddish solid was then filtered, dried in the air and ground to a greyish powder, the "testinic acid" MD–31 (0.25 g.). It was insoluble in water and various organic solvents, such as acetone, ether, chloroform, benzene and ethyl acetate. It was partly soluble in 95 percent ethanol and methanol on heating while in dimethyl sulfoxide it gave a red colored solution. The solid was completely soluble in 0.3 percent aqueous alkali (sodium or potassium hydroxide) and could be reprecipitated by acidifying the solution with dilute hydrochloric acid (1:1).

EXAMPLE NO. 4

ETHYL ACETATE EXTRACT OF THE ACIDIFIED CAUSTIC DESORBATE OF THE NYLON-66 BEER ADSORBATE (MD–35).

One liter of the caustic desorbate of the Nylon-66 beer adsorbate (from EXAMPLE NO. 2) was acidified as above, the solid "testinic acid" MD–31 removed by filtration and the acidic mother liquor extracted with 0.5 l. of ethyl acetate in a liquid-liquid extractor for 20 hours. The yellow ethyl acetate extract was dried over anhydrous magnesium sulfate, filtered and evaporated under reduced pressure to afford a dark-red viscous oil (0.65 g.). It solidified after standing several days in a refrigerator (Preparation MD–35).

EXAMPLE NO. 5

AMYL ALCOHOL EXTRACT OF THE ACIDIFIED CAUSTIC DESORBATE OF THE NYLON-66 BEER ADSORBATE (MD–37).

One liter of the caustic desorbate of the Nylon-66 beer adsorbate (from EXAMPLE NO. 2) was acidified with hydrochloric acid as before and the solid "testinic acid" MD–31 (0.25 g.) removed by filtration. The acidic filtrate was extracted with three 150 ml. portions of amyl alcohol in a separatory funnel. The emulsion was broken by adding sodium chloride and the upper alcoholic layer (red colored) was dried over anhydrous magnesium sulfate, filtered and concentrated under reduced pressure to leave MD–37 as a dark oil (1.4 g.).

EXAMPLE NO. 6

THE LYOPHILIZATE OF THE DESORBATE OF THE NYLON-66 BEER ADSORBATE (MD–65).

One liter of the caustic desorbate of the Nylon-66 beer adsorbate (from EXAMPLE NO. 2) was freeze-dried to leave a brownish solid (12.5 g) which was ground to a greyish powder (Preparation MD–65). It was treated with n-butanol:hydrochloric acid (5:1) to leave approximately 55 percent of the inorganic precipitate (caustic).

EXAMPLE NO. 7

ADDITION OF QUERCETIN TO BEER

Quercetin (a beer constitutent) was found to be beneficial to beer stability in the concentration of 100 ppm under described experimental conditions as evinced by the measurement of FTU (formazin turbidity units according to the standard procedure of the American Society of Brewing Chemists, 1957), forcing FTU and the taste panel verdicts. The experiments were performed using storage tanks containing 20 l. of primary filtered beer. 1.5 g. of papain was added to each tank followed by the addition of quercetin under cold storage conditions. The beer was left under carbon dioxide for a week (in a refrigerator), filtered, carbonated and bottled (12 ounce bottles were used). The bottles were rotated for seven days at 10 rpm. The measurements of FTU and forcing FTU were performed for the experimental beer samples as well as for the appropriate beer controls. An additional amount of air (2 ml.) was added to some experimental beers as well as to the appropriate beer controls and the FTU and the forcing FTU tests were carried out in order to investigate the antioxidant capacity of quercetin in the presence of excessive amounts of air. In both cases, i.e., with no extra air added to the bottles as well as with 2 ml. of air added, the experimental beers containing quercetin showed better stability than the control beer as expressed by lower FTU and forcing FTU values of the former (TABLE 1). All beer samples with the corresponding controls were submitted to the professional taste panels and the verdicts were favorable. A beer sample treated as described with 100 ppm of quercetin was shelved for six months along with the appropriate control and the FTU of the former was found to be much lower (TABLE 1) while its taste was still quite acceptable.

TABLE 1

| Amount of quercetin added to beer | FTU of freshly bottled beer | | Forcing FTU of freshly bottled beer | | FTU after 6 months shelf life | |
|---|---|---|---|---|---|---|
| | Control beer | Beer with quercetin added | Control beer | Beer with quercetin added | Control beer | Beer with quercetin added |
| 10 ppm | 60 | 48 | 112 | 108 | | |
| 10 ppm + 2 ml. of air | 58 | 46 | 154 | 140 | | |
| 50 ppm | 106 | 84 | 200 | 186 | | |
| | 280 | 250 | 412 | 396 | | |
| | 28 | 20 | 200 | 186 | | |
| 50 ppm. + 2 ml. of air | 164 | 123 | 270 | 244 | | |
| | 340 | 290 | 545 | 501 | | |
| 100 ppm | 128 | 20 | 200 | 130 | 475 | 196 |
| | 102 | 66 | 200 | 130 | | |
| | 280 | 76 | 396 | 200 | | |
| | 28 | 20 | 108 | 46 | | |
| 100 ppm. + 2 ml. of air | 106 | 84 | 200 | 186 | | |
| | 340 | 250 | 541 | 412 | | |

It is clear from the consistently lower values of both FTU- and forcing FTU-values for the beers treated with quercetin as opposed to the appropriate control beers that quercetin in the range of 10–100 ppm or more acts beneficially as a stabilizer (antioxidant) for beer even in the presence of elevated air contents. The positive verdicts of a taste panel for the experimental beers established quercetin in the same range as a beneficial flavor stabilizer. Therefore quercetin in the range of 10 – 100 ppm or more acts as an antioxidant to enhance both colloidal and flavor stability of beer and other malt beverages.

EXAMPLE NO. 8

ADDITION OF PREPARATION MD-31 TO BEER

Preparation MD-31 (from EXAMPLE NO. 3) was used with the beer under the conditions described for quercetin (EXAMPLE NO. 7) and was found to exhibit antioxidant properties (TABLE 2). A six month old beer sample had a normal taste, while the corresponding control showed an off-taste.

TABLE II

| Amount of MD-31 added to beer | FTU of freshly bottled beer | | Forcing FTU of freshly bottled beer | | FTU after 6 months shelf life | |
|---|---|---|---|---|---|---|
| | Control beer | Beer with MD-31 added | Control beer | Beer with MD-31 added | Control beer | Beer with MD-31 added |
| 10 ppm | 60 | 42 | 112 | 78 | 562 | 278 |
| | 60 | 40 | 112 | 80 | | |
| | 170 | 142 | 562 | 350 | | |
| 10 ppm + 2 ml. air | 56 | 42 | 140 | 96 | | |
| | 58 | 40 | 140 | 96 | | |
| | 280 | 242 | 697 | 357 | | |
| 50 ppm | 304 | 170 | 805 | 502 | | |
| 50 ppm + 2 ml. air | 399 | 242 | 934 | 697 | | |
| 100 ppm | 31 | 28 | 204 | 146 | | |

EXAMPLE NO. 9

ADDITION OF MD-35 TO BEER

Preparation MD-35 (from EXAMPLE NO. 4) was used with the beer under conditions described for quercetin (EXAMPLE NO. 7) and was found to exhibit flavor stabilizing properties. Thus 6 month old beer sample had a normal taste while the corresponding control showed an off-taste.

EXAMPLE NO. 10

ADDITION OF MD-37 TO BEER

Preparation MD-37 (from EXAMPLE NO. 5) was used with beer under conditions described for quercetin (EXAMPLE NO. 7) and was found to exhibit flavor stabilizing properties. Thus six month old beer sample had a normal taste while the corresponding control showed an off-taste.

EXAMPLE NO. 11

ADDITION OF MD-63 TO BEER

Preparation MD-63 (from EXAMPLE NO. 1) was used with beer under the conditions described for quercetin (EXAMPLE NO. 7) and was found to exhibit flavor stabilizing properties. Thus six month old beer sample had a normal taste while the corresponding control showed an off-taste.

EXAMPLE NO. 12

ADDITION OF MD–65 TO BEER

Preparation MD–65 (from EXAMPLE NO. 6) was used with beer under conditions described for quercetin (EXAMPLE NO. 7) and was found to exhibit flavor stabilizing properties. Thus 6 month old beer sample had a normal taste while the corresponding control showed an off-taste.

It thus will be seen that applicants have found that the numerous polyphenols present in malt beverages such as beer may be divided into harmful polyphenols, beneficial polyphenols and neutral polyphenols insofar as the stability of the beverage is concerned and the various compositions referred to heretofore have a preponderance of beneficial polyphenols in that they increase the stability of the beer.

The embodiments of the invention in which an exclusive property or privilege is claimed are defined as follows:

1. A method of preparing a composition for use in improving the stability of a malt beverage which comprises passing a malt beverage through a powdered nylon resin and treating an adsorbate retained on the nylon resin by refluxing the powdered nylon resin containing the adsorbate with dilute hydrochloric acid to solubilize the adsorbate, extracting the solution so obtained with ether and drying the ether containing layer to obtain the composition.

2. A method as claimed in claim 1 for preparing a composition suitable for improving the stability of beer which comprises passing beer through a powdered Nylon-66 resin, refluxing the adsorbate so obtained with dilute hydrochloric acid to solubilize the adsorbate, extracting the solution so obtained with ether and drying the ether containing layer to obtain the composition.

3. The composition suitable for improving the stability of beer produced by the process of claim 1.

4. A method of preparing a composition for use in improving the stability of beer which comprises passing beer through a powdered Nylon-66 resin, heating the adsorbate so obtained with dilute aqueous sodium hydro-oxide solution to solubilize the adsorbate, filtering to remove the resin, acidifying the solution otained with concentrated hydrochloric acid to a pH below 2 to form a precipitate, filtering the precipitate from the acidic mother liquor, extracting the acidic mother liquor with ethyl acetate, and evaporating the ethyl acetate from the extract to obtain the composition.

5. A method of preparing a composition for use in improving the stability of beer which comprises passing beer through a powdered Nylon-66 resin, heating the adsorbate so obtained with dilute aqueous sodium hydro-oxide solution to solubilize the adsorbate, filtering to remove the resin, acidifying the solution obtained with concentrated hydrochloric acid to a pH below 2 to form a precipitate, filtering the precipitate from the acidic mother liquor, extracting the acidic mother liquor with amyl alcohol, and evaporating the amyl alcohol from the extract to obtain the composition.

6. A method of improving the stability of beer which comprises adding thereto from about 10 to 100 parts per million of a composition prepared by passing a beer through a powdered nylon resin and treating an adsorbate retained on the nylon resin by refluxing the powdered nylon resin containing the adsorbate with dilute hydrochloric acid to solubilize the adsorbate, extracting the solution so obtained with ether and drying the ether containing layer to obtain said composition.

7. The method as claimed in claim 6 wherein the powdered nylon resin is a powdered Nylon-66 resin.

* * * * *